May 19, 1964 PAUL W. WOO 3,134,099

ULTRASONIC DATA CONVERTER

Filed Dec. 21, 1962

INVENTOR
PAUL W. WOO
BY George C. Kuitom
AGENT

3,134,099
ULTRASONIC DATA CONVERTER

Paul W. Woo, Poughkeepsie, N.Y., assignor to International Business Machines Corporation, New York, N.Y., a corporation of New York Filed Dec. 21, 1962, Ser. No. 246,557
12 Claims. (Cl. 340—347)

This invention relates to apparatus for data conversion. More particularly, the invention relates to ultrasonic apparatus for converting graphical information in the form of letters, symbols, or the like, into digital form.

The progressive sophistication, both in capability and in application, of digital computers, has extended their usefulness to areas other than mere computations. One of the most vexing problems, however, lies in the area of direct communications between man and computer. To date, the most direct link has generally involved the use of a mechanical typewriter with its limited range of symbols.

It is an object of this invention to literally "write" conventional symbols into a digital computer, or the like.

It is another object of this invention to convert data of a graphical form into digital form.

Writing normally involves the use of a pencil and paper. If, for example, the particular "pencil" happens to be a stick of crayon, and the necessary "writing" is that of providing a detailed engineering drawing, a major problem immediately presents itself. The resolution of the crayon, that is, the number of lines per inch which can be drawn, is not very high.

A problem analogous to that of trying to provide a detailed engineering drawing with a crayon, occurs in the area of "writing" graphical information into a digital computer, or the like. It is important that the resolution of the "writing" process be sufficiently high.

It is another object of this invention to "write" into a digital computer, or the like, with very high resolution.

Prior art devices which have approached the problem of converting graphical information into a form suitable for recording, or storage, have been faced with another problem, in addition to that of low resolution. Most of the prior art devices are characterized by the use of a "pen," which is one end of an electrical conductor, "writing" on an electrically conductive surface, so that the position of the "pen" at any one time, with respect to the edges of the writing medium, is established by the potential difference between ground and that sensed by the "writing" conductor. Since accuracy of reproduction of the graphical symbol traced, involves the continuous position determination of the "pen" with respect to the reference edges of the writing medium, uniformity of characteristics of the writing medium relied upon to provide this position information is highly critical. Lack of uniformity, or lack of linearity of the medium, introduces distortions in the recorded form of the actual graphical symbol traced.

Accordingly, it is still another object of this invention to "write" graphical information into a digital computer or the like with a minimum amount of distortion.

Additional objects of the invention include:

To provide apparatus for converting graphical information into digital form which utilizes a minimum number of electronic components.

In accordance with the invention traveling mechanical disturbances are created in an isotropic medium which acts as a vehicle for the propagating disturbances. Sensing means, which may trace the outline of any symbol or the like across the surface of the isotropic medium, are placed in contact with the isotropic medium and sense the propagating mechanical disturbances at a certain time after the creation of the mechanical disturbances. The time interval elapsed between the creation and the sensing of the mechanical disturbances represents the position of the sensing means on the isotropic medium; this elapsed time interval, which denotes the position of the sensing means, is then converted to a digital quantity suitable for use by a digital computer or the like.

In the preferred embodiment of the invention, piezoelectric materials are employed to create, and sense, the propagating mechanical disturbances. Use is made of a property of these piezoelectric materials which cause them to transmit substantially pure sinusoidal waves of a characteristic frequency when they are actuated, or excited by an impulse. The significance of this property, particularly as it relates to the resolution capabilities of the present invention, will be described hereafter.

The foregoing and other objects, features and advantages of the invention will be apparent from the following more particular description of a preferred embodiment of the invention, as illustrated in the accompanying drawings.

*General Structure*

Figure 1:
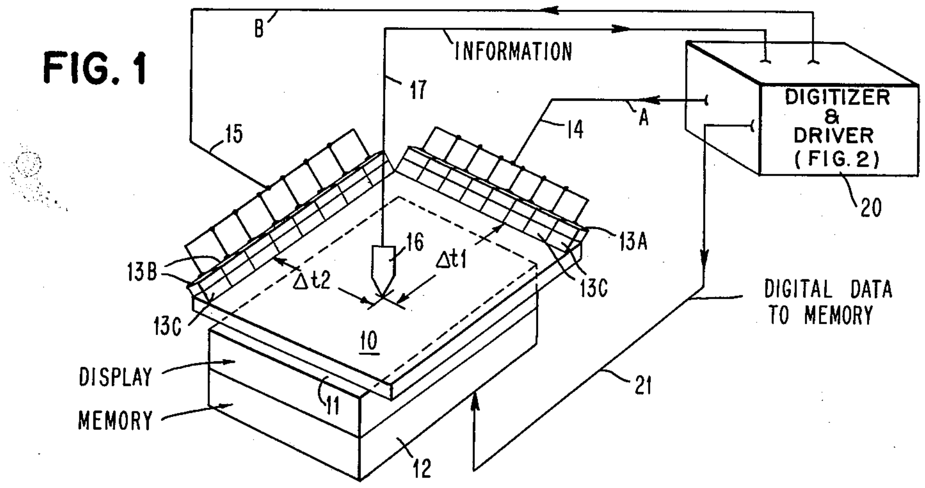
FIG. 1 is a schematic diagram of apparatus of the invention in a cooperative relationship with a digital computer capable of displaying any information in its memory in visual form.

Referring now to FIG. 1, there is shown a preferred embodiment of the invention. A generally rectangular sheet of optical glass 10, such as crown glass, is disposed directly above the display section 11 of a suitable digital computer 12. Crown glass is a lime-soda-alumina glass with high refraction and low dispersion. The glass sheet 10 is also preferably transparent for reasons which will become apparent later. Disposed along two of the major intersecting edges of the glass sheet 10 are a plurality of piezoelectric transducers 13A and 13B. The transducers 13A and 13B are coupled to sheet 10, so as to achieve the propagation of surface waves in sheet 10. Those skilled in the art will know that this may, for example, be accomplished by insertion of angle adapters 13C of Lucite material (a trademark of the Du Pont Corporation for methacrylate ester polymers) between the transducers 13A (13B) and sheet 10. The angle of the angle adapters 13C is chosen in accordance with Snell's law of refraction so as to achieve the creation of surface waves in sheet 10. The plurality of piezoelectric transducers 13A are connected for simultaneous excitation through conductor 14 which is connected to each one of the individual piezoelectric transducers 13A. Similarly, the plurality of piezoelectric transducers 13B are connected by conductor 15 in an identical manner.

A writing pen 16 is shown in contact with the glass sheet 10. This writing pen 16 embodies a piezo-electric component which is connected by conductor 17 to a piece of control equipment 20.

It is noted that in the preferred form of the invention, the isotropic medium employed is an optical glass such as crown glass. However, it will later be made clear that the requirements imposed on the nature of the isotropic medium can be satisfied by a number of materials. Further, while piezoelectric transducers are preferably employed to create the mechanical disturbances, the invention is not so limited. The general class of magnetostrictive materials is also representative of materials which may be employed to create the mechanical disturbances. In fact, broadly stated, any electromechanical transducer, in the sense that an electrical signal is converted to a mechanical disturbance, or vice-versa, would serve the basic invention.

*General Operation*

The writing pen 16 is adapted to be manually placed in contact with glass sheet 10 and is adapted to trace any graphical symbol across the surface of glass sheet 10. In this manner, it may be made to follow the contour of any graph, symbol, or letter. Control unit 20 issues sequential excitation signals on lines 14 and 15. These sequential excitation signals excite first, the plurality of piezo-electric transducers 13A which are coupled to the glass sheet 10. The piezoelectric transducers 13A create a mechanical disturbance, more properly a mechanical stress wave, which propagates across the surface of glass sheet 10 at a substantially uniform velocity. With the writing pen 16 a fixed distance away from the edge of the glass sheet 10, it will take a certain time interval $\Delta t1$ for the propagating mechanical disturbance to reach pen 16. Pen 16, placed in contact with glass sheet 10, senses the propagating mechanical disturbance and issues an appropriate signal to control unit 20 via conductor 17. Control unit 20 measures the elapsed time interval $\Delta t1$ between the time that a control signal A is transmitted on line 14 and the time that the signal is received on line 17. Control unit 20 then digitizes, that is, converts the magnitude of the elapsed time interval $\Delta t1$, into a digital quantity.

Control unit 20 then issues a second excitation signal B via conductor 15 to actuate the second plurality of transducers 13B which will propagate a second mechanical disturbance across the surface of the glass sheet 10. It is noted, that in this preferred embodiment of the invention, the propagation paths of the mechanical disturbances are mutually perpendicular. After a finite time interval. $\Delta t2$, after the creation of the mechanical disturbance by transducers 13B, writing pen 16, in contact with glass sheet 10, senses the arrival of the propagating disturbance and issues a signal to control unit 20 via conductor 17. Control unit 20 digitizes the elapsed time interval $\Delta t2$ into a digital quantity.

Successive positions of the writing pen 16, as it traces a variable path over glass sheet 10, are successively determined by a series of similar operations. Thus, control unit 20 by issuing a number of sequential excitation signals A and B to respective transducers 13A and 13B, "laces" glass sheet 10 with a succession of mutually perpendicular mechanical disturbances. The time of arrival of each of these mechanical disturbances is in turn sensed by writing pen 16 wherever it may be on the glass sheet 10, and, whenever a disturbance is so sensed, a signal is transmitted to control unit 20 which then digitally represents the position of the writing pen 16 anywhere on the glass sheet in terms of its location with respect to the major edges thereof. The digital data generated by control unit 20 in response to successive positions of writing pen 16 is transmitted, via conductor 21, to the digital computer 12. Digital computer 12, which has a display capability in display section 11, reconverts the digital data stored in its memory to graphical form. Advantageously, the graphical display of digital information may be accomplished by the use of apparatus which is generally known in the art as an "end point" character generator. This is apparatus generally characterized by deflecting an electron beam across the face of a cathode ray tube, from "end-point to end-point." The successive deflections of the electron beam occur in response to successive groups of digital data, which when converted to analog form, establish successive deflection potentials. Selective blanking or unblanking of the electron beam while it is thus traversing the face of a cathode ray tube, leaves a series of visible traces which synthesize any symbol or the like. Thus, since glass sheet 10 is preferably transparent, the observer who has traced writing pen 16 across glass sheet 10, can tell what he has just written because glass sheet 10 is disposed directly above the display area 11 of digital computer 12. That is, the display area 11 serves to provide a check on what has been written. This illustrates one of the preferred modes of the invention. Its use, however, is not restricted to the particular application just described.

*Detailed Structure*

Figures 2, 4:
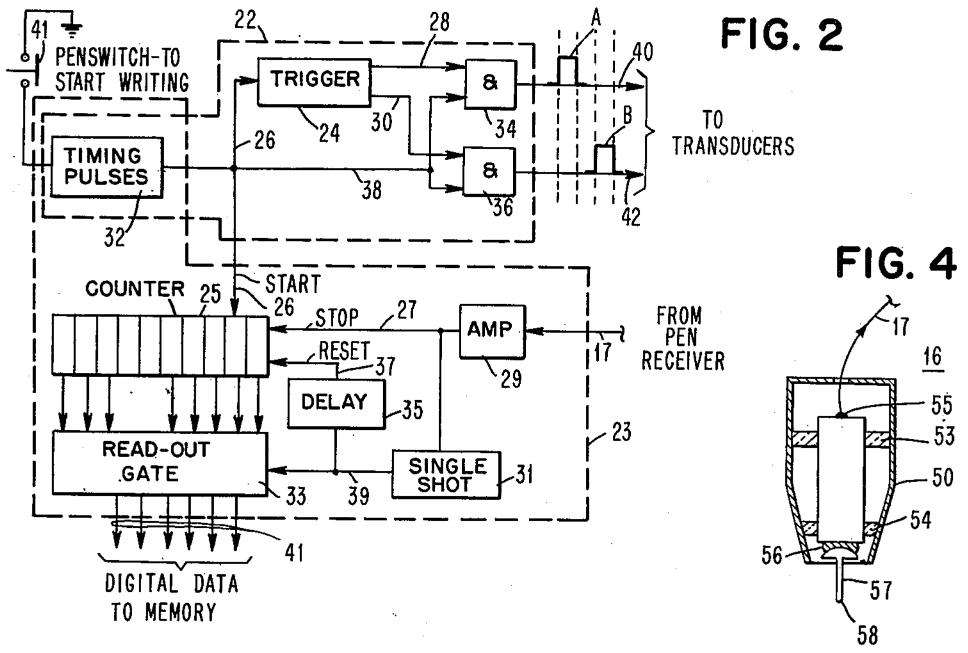
FIG. 2 is a block diagram of electronic circuitry used in the apparatus shown in FIG. 1.
FIG. 4 is a cross-sectional view of a sensing means usable in the invention.

Referring now to FIG. 2, there is shown the electronic circuitry embodied within control unit 20. From the previous description, it is apparent that control unit 20 has two major functions:

(1) To sample, or drive the piezoelectric transducers 13A and 13B at a fixed rate, so that glass sheet 10 is continually sampled for position information of writing pen 16.

(2) To digitize, that is to convert, into a digital quantity, the elapsed time interval between the time that a stress wave is initiated in the medium 10 and the time that it is sensed by the receiving pen 16.

The two major functions of control unit 20 are accomplished by circuitry within blocks 22 and 23.

*Driver Block 22*

Driver block 22 comprises a binary trigger 24 well known to those skilled in the art. Binary trigger 24 receives a series of impulses from source of timing pulses 32, via line 26. Upon receipt of each timing pulse, binary trigger 24 causes its two output terminals 28 and 30 to assume alternate states. That is, if after receipt of one timing pulse from timing pulse source 32, output 28 of binary trigger 24 is in the high state, a subsequent timing pulse from source 32 will cause binary trigger 24 to switch this high state to output 30.

Two AND circuits 24 and 26, well known to those skilled in the art, each take one of the output signals from binary trigger 24. That is, the output terminal 28 of binary trigger 24 is connected to AND circuit 24, while the output 30 of binary trigger 24 is connected to AND circuit 36. AND circuits 34 and 36 also receive, as their second input, timing pulses from source of timing pulses 32, via conductor 38. The output of AND circuit 34 is transmitted on terminal 40 to excite the plurality of piezoelectric transducers 13A. The output of AND circuit 36 is transmitted on terminal 42 to excite the plurality of piezoelectric transducers 13B.

In operation, successive timing pulses from source 32 causes binary trigger 24 to continually alternate in applying conditioning inputs to AND circuits 34 and 36. Assuming that binary trigger 24 has just been switched so that terminal 28 is high, the same timing pulse that switched binary trigger 24 to its high state on terminal 28 is applied also to AND circuit 34. Thus, both inputs 28 and 38 to AND circuits 34 are high, and AND circuit 34 therefore produces an output signal on terminal 40. The next timing pulse emitted from source 32 causes binary trigger 34 to switch its high state to terminal 30, thereby removing the conditioning input to AND circuit 34. However, both inputs 30 and 38 to AND circuit 36 are now in the high state, which causes AND circuit 36 to emit a signal on terminal 42.

The above cycle of events repeats itself continuously so that successive signals are emitted alternately on terminals 40 and 42. The spacing between signals on lines 40 and 42, that is the interval between the time that a signal has appeared on terminal 40 (42) and a signal appears on terminal 42 (40) is made long enough to allow the mechanical disturbance, which results from such a signal, to travel across the entire length of glass sheet 10. Therefore, when the next mechanical disturbance is initiated in sheet 10, the previous one has decayed. It is also noted that, if in a given case, it is found that reflections from the free edges of the isotropic medium are bothersome, a suitable damping agent, such as a strip of masking tape, for example, may be attached to the edges opposite to those edges carrying the transducers 13A and 13B to absorb the propagating mechanical disturbances.

*Digitizer Block 23*

Referring now to the digitizer block 23 of FIG. 2, a free-running binary counter 25 starts counting upon receipt of a timing pulse from source 32 via conductor 26. In general, the higher the number of positions that free-running counter 25 can count to, the higher the resolution capabilities of the invention. Free-running counter 25 is connected via conductor 27 to the output of amplifier 29, which in turn receives signals via conductor 17, from writing pen 16. The output of amplifier 29 is also transmitted to a conventional single shot multivibrator 31, of a type well known to the man skilled in the art. The output of single shot multivibrator 31 is applied to a read out gate 33. The output of single shot multivibrator 31 is also transmitted, through a conventional delay circuit 35, to the reset terminal 37 of the free running binary counter 25.

In operation, the source of timing pulses 32 is actuated when switch 41 is closed. Switch 41 may be of conventional type to indicate the placing of pen 16 on sheet 10. Upon the receipt of a START pulse from source 32, via conductor 26, free-running binary counter 25 starts counting and will continually advance its count until a signal is received from writing transducer 16, via conductor 17. This signal is amplified by amplifier 29 whose output is directly transmitted to the STOP terminal 27 of free-running binary counter 25. Upon receipt of a signal from amplifier 29, free-running binary counter 25 stops counting, and its current count position digitally represents the elapsed time interval between receipt of the START signal on conductor 26 (which actuated one bank of the plurality of transducers 13A or 13B) and the receipt of the signal on conductor 27 (which indicates the sensing of the mechanical disturbance by writing pen 16). Thus, the elapsed time interval is represented by the current count stored in the binary counter 25.

The single shot multivibrator 31, which is also responsive to the output of signals of amplifier 29, issues a single READ OUT signal, via conductor 39, to read out gate 33, which thereupon reads out the counter contents of binary counter 25 onto a plurality of lines 41 which channel the binary data to the memory of a digital computer, for example. While the digital count information stored in binary counter 25 is being read out in response to the signal on line 39, delay circuit 35 delays the READ OUT signal for a slight amount of time and then applies a RESET signal, via line 37, to the RESET terminal of binary counter 25, which is then reset to a zero count. Upon receipt of the next START signal via conductor 26 (which indicates the activation of the second bank of the piezoelectric transducers 13A or 13B), binary counter 25 again starts counting until a signal from the writing pen 16 is received by amplifier 29. Thereafter, the binary counter 25 is, again, (*a*) Stopped,
(*b*) Read out, and
(*c*) Reset to a zero count.

In summary, digitizer block 23 has converted a time interval—which represents the position of writing pen 16 with respect to a major edge of the glass sheet 10—in terms of the contents of a free-running binary counter which is started when a mechanical disturbance is created in glass sheet 10, and which is stopped when writing pen 16 indicates the sensing of that mechanical disturbance.

Figure 3:
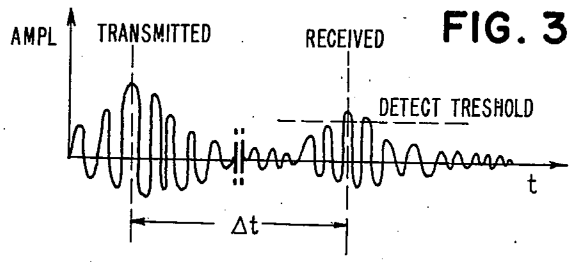
FIG. 3 is a wave diagram of transmitted and received ultrasonic waves.

Reference is now made to FIG. 3 to explain desirable characteristics of certain components of the invention. Piezoelectric transducers 13A and 13B are preferably barium titanate crystals which are adapted to oscillate at a characteristic frequency when excited by excitation pulses. In the preferred embodiment of this invention, piezoelectric transducers 13A and 13B have a characteristic, or resonant, frequency of 5 mc., far above the sonic range, which extends to only about 20,000 cycles. Hence, the term "ultrasonic" may be used to characterize the piezoelectric transducers 13A and 13B. The nature of the resonant oscillations of piezoelectric transducers 13A and 13B, and hence, the nature of the mechanical disturbances which are propagated across the surface of glass sheet 10, is shown in FIG. 3.

Upon receipt of an excitation impulse A (B) on the conductors 14 (15), the plurality of transducers 13A (13B) begin to oscillate substantially as a unit. This oscillation is, as shown in FIG. 3, a substantially pure sinusoidal oscillation which builds up in amplitude to a peak whereafter, upon removal of the excitation impulse, the piezoelectric transducers settle down to a quiescent state. The oscillations of the piezoelectric transducers are coupled to the glass sheet 10 and create a mechanical disturbance which propagates across the surface of glass sheet 10 at a uniform velocity. While the mechanical disturbances, in the form of these oscillations, propagate across the surface of the glass sheet 10, they are in practice attenuated somewhat so that the received mechanical disturbances, shown in FIG. 3, have a slightly lower amplitude than the transmitted waveform. However, it should be noted that the received waveform is not otherwise distorted.

The received mechanical disturbance, as sensed by the writing pen 16, again builds up in amplitude and reaches a peak which is shown as occurring on the third cycle. The measured time interval $\Delta t$ is determined from a time beginning at the time at which the transmitted waveform reaches its maximum amplitude—which may be experimentally determined, and for which the system is initially adjusted—and the time that the received signal (received by writing pen 16) has sufficiently exceeded the detection threshold of amplifier 29. Because the wavelength of the propagated mechanical waves is, at the frequencies of the invention, on the order of hundredths of an inch, successive peaks of the received signal will be so spaced. This means, in effect, that the position of pen 16 on sheet 10 is determinable to the same order of magnitude, so that extremely high resolution is achieved.

Reference is now made to FIG. 4 which shows the basic details of a writing pen 16. Writing pen 16 comprises an outer housing 50 of sufficient mechanical rigidity to hold therein a piezoelectric crystal 51 which preferably may be a lithium sulphate crystal. Piezoelectric crystal 51 is mechanically spaced, and suitably acoustically insulated from housing 50, by means of washers 53 and 54. A conductor 17 is connected to piezoelectric crystal 51 at point 55. Fastened to the lower edge of piezoelectric transducer 51, by means of a suitable adhesive and mechanical couplant 56, is a sharply pointed piece of metal 57 which looks like a thumb tack.

In operation, writing pen 16 is placed in contact with the glass sheet 10, particularly tip 58 of the writing pen 16. As the writing pen moves across the surface of glass sheet 10, while tracing a symbol or the like, the mechanical disturbances created by the piezoelectric transducers 13A and 13B are coupled through tip 58 of writing pen 16 to the piezoelectric crystal 51, which, in response to these mechanical disturbances, generates an electrical signal which is applied to conductor 17 connected to piezoelectric crystal 51. The electrical signal on conductor 17 is then applied to amplifier 29 and causes a sequence of events as described above.

*Other Modifications*

While the invention has been described with respect to a preferred embodiment using a generally rectangular sheet of transparent crown glass, utilized as the isotropic medium, it will occur to those skilled in the art that a number of modifications are possible. The general requirements for the writing medium are that it have a substantially linear propagation velocity for mechanical disturbances, and that the medium be isotropic, that is, that it not discriminate against the direction in which the mechanical disturbances travel through the medium. A wide variety of materials can satisfy this condition. For example, plastics can be used instead of glass. Plastic materials may be desirable in a number of other applications, where their advantages would dominate those of glass. In addition, while the propagation of surface waves in a medium is theoretically lossless, that is, that there is no attenuation in the propagated mechanical disturbances, practical considerations enter which always introduce some amount of attenuation. For this reason, it is advantageous to use low-loss, or low-attenuation, isotropic materials. Also, while the writing tablet of the invention is preferably transparent, other applications of the invention may dictate only translucent, sometimes even an opaque, writing table. It has been pointed out previously in the specification, that the transparency of the medium is desirable when a computer display is used to display the information just traced to provide a checking feature. But it is clearly within the scope of invention to provide a check some other way, for example, by interposing a thin sheet of pressure-sensitive paper, commercially available, between the pen 16 and sheet 10. In this mode, pen 16, in addition to serving its described function, also provides a simultaneous graphical replica of the information generated, on the pressure-sensitive paper. Clearly, in such a mode, transparency of the isotropic medium 10 is not a critical factor. The check is provided, not by the computer display, but by the pressure-sensitive paper.

Further, the invention has been described with reference to a rectangular shape of the isotropic medium or writing tablet. The digital data which thus represents the position of writing pen 16 with respect to the edges of the glass sheet 10, is naturally in the form of $X-Y$ coordinate quantities. However, the invention is certainly not limited to this shape of the isotropic medium. For example, if the edges were at an angle of other than 90°, i.e., not mutually perpendicular, it is clear that the position of writing pen 16 with respect to either one of the major edges can still be accomplished. If the piezoelectric transducers 13A and 13B are "lacing" the medium 10 with mechanical disturbances which are other than mutually perpendicular—subject, of course, to the requirement that there be some angle other than 180° between the direction of the mechanical disturbances, i.e., the directions are mutually exclusive—it is nevertheless a fact that the disturbances which are so created are perpendicular to the edges. The position of writing pen 16 is thus determined by the perpendicular from the major edges. Thus, the information, although it is not naturally in the conventional $X-Y$ coordinate form, still provides enough data to uniquely define the position of writing pen 16 with respect to the major edges of the glass sheet. For example, where a particular application dictates the design of the glass sheet to be other than rectangular, suitable translating means may be employed to transform one set of the digital data furnished by the apparatus (that is, either $\Delta t1$ or $\Delta t2$), so that the transformed digital quantity $\Delta t1$ or $\Delta t2$ and the other digital quantity, $\Delta t2$ or $\Delta t1$, define mutually perpendicular $X-Y$ coordinate information.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for converting graphical information into digital information comprising:
   a sheet of isotropic material;
   driver means coupled to said sheet and adapted to create traveling mechanical disturbances in said sheet;
   sensing means placed in contact with said sheet and adapted to sense said traveling mechanical disturbances, said sensing means including means for emitting a signal indicative of the sensing of a mechanical disturbance in said sheet; and
   electronic digitizing means connected to said driver means and said sensing means for digitally representing the elapsed time interval between the creation of said mechanical disturbances by said driver means and the sensing of said mechanical disturbances by said sensing means.

2. Apparatus for converting graphical information into digital information, comprising:
   a sheet of isotropic material;
   driver means coupled to said sheet and adapted to create successive traveling mechanical disturbances in at least two mutually exclusive directions in said sheet;
   sensing means placed in contact with said sheet and adapted to sense said traveling mechanical disturbances, said sensing means including means for emitting a signal indicative of the sensing of a mechanical disturbance in said sheet; and
   electronic digitizing means connected to said driver means and said sensing means for digitally representing the elapsed time interval between the creation of said mechanical disturbances by said driver means and the sensing of said mechanical disturbances by said sensing means.

3. Apparatus for converting graphical information into digital information, comprising:
   a sheet of isotropic material having at least two major intersecting edges;
   driver means coupled to said sheet and adapted to create, at least a first mechanical disturbance normal to one of said major edges, and subsequently, a second mechanical disturbance, normal to the second one of said major edges, said mechanical disturbances propagating in said sheet at a substantially uniform velocity;
   sensing means in contact with said sheet and adapted to sense said propagating mechanical disturbances in said sheet and including means for emitting a signal indicative of the sensing of said mechanical disturbance; and
   electronic digitizing means connected to both said driver and said sensing means for digitally representing the elapsed time interval between the creation of said mechanical disturbances by said driver means and the sensing of said mechanical disturbances by said sensing means.

4. Apparatus according to claim 1 wherein said isotropic material is transparent.

5. Apparatus according to claim 1 wherein said isotropic material is glass.

6. Apparatus for converting graphical information into digital information comprising:
   a sheet of crown glass having at least two mutually perpendicular edges;
   a plurality of piezoelectric transducers arranged along said mutually perpendicular edges;
   electronic driving means for sequentially activating, first, the piezoelectric transducers coupled to a first one of said mutually perpendicular edges and, subsequently, the piezoelectric transducers coupled to the second of said mutually perpendicular edges, whereby, successive and mutually perpendicular mechanical disturbances are caused to propagate in said sheet of glass;
   piezoelectric sensing means in contact with said sheet and adapted to be moved so as to trace a variable path over said sheet;
   said piezoelectric sensing means including means for emitting a signal indicative of the sensing of a mechanical disturbance;
   electronic digitizing means connected to said piezoelectric sensing means and said electronic driving means and including a binary counter adapted to be started when said electronic driving means actuate said piezoelectric transducers, and adapted to be stopped when said sensing means produce a signal indicating the sensing of a mechanical disturbance, whereby, the elapsed time interval between the creation of said mechanical disturbance and the sensing of said mechanical disturbance is digitally represented by the contents of the counter at the time it is stopped, thus indicating the location of said sensing means with respect to the edges of said sheet of glass.

7. Apparatus according to claim 6 wherein said piezoelectric transducers have a characteristic resonance frequency and are adapted to oscillate in a substantially pure sinusoidal fashion when excited.

8. Apparatus according to claim 7, where said resonance frequency is ultrasonic.

9. Apparatus according to claim 6 wherein said electronic driver means include:

a source of timing pulses;

a binary trigger circuit, having two outputs, connected to the source of said timing pulses;

a first gating circuit connected to one of the outputs of said trigger circuit and said source of timing pulses;

a second gating circuit connected to the other output of said trigger and said source of timing pulses;

said gating circuits having output terminals, the output terminal of said first gating circuit being connected to the plurality of piezoelectric transducers coupled to the first of said edges, the output of said second gating circuit being connected to the plurality of piezoelectric transducers coupled to the second of said edges.

10. Apparatus according to claim 6 wherein said electronic digitizing means include:

a source of timing pulses;

a free-running binary counter having at least a START and a STOP terminal, said source of timing pulses applying pulses to the START terminal of said free-running binary counter;

amplifier means, having an output, connected to said sensing means for amplifying the signal received from said sensing means;

said amplifier output being connected to the STOP terminal of said free-running binary counter, whereby said binary counter starts counting when actuated by a timing pulse from said source of timing pulses, and stops counting, when said amplifier produces an output signal.

11. Apparatus for converting graphical information into digital information comprising:

an isotropic medium;

means coupled to said isotropic medium and adapted to create traveling mechanical disturbances in said medium;

means in contact with said isotropic medium and adapted to sense said traveling mechanical disturbanecs, said sensing means including means for emitting a signal indicative of the sensing of a mechanical disturbance in said medium; and means connected to said first-named means and said sensing means for digitally representing the elapsed time interval between the creation of said mechanical disturbance by said first-named means and the sensing of said mechanical disturbances by said sensing means.

12. Apparatus for converting graphical information into digital information comprising:

an isotropic medium;

means coupled to said isotropic medium and adapted to create successive traveling mechanical disturbances in at least two mutually exclusive directions in said medium;

means placed in contact with said medium for sensing said traveling mechanical disturbances, said sensing means including means for emitting a signal indicative of the sensing of a mechanical disturbance in said medium; and means connected to said first-named means and said sensing means for digitally representing the elapsed time interval between the creation of said mechanical disturbance by said first-named means and the sensing of said mechanical disturbances by said sensing means.

No references cited.